United States Patent
Weiss et al.

(10) Patent No.: US 6,477,381 B1
(45) Date of Patent: Nov. 5, 2002

(54) SELECTIVE CALL RECEIVER AND METHOD FOR DETECTING MANDATORY FRAMES OF A CHANNEL PROTOCOL

(75) Inventors: Karl Robert Weiss, Condotel (SG); Dee Nai Ong, Singapore (SG); David Frank Willard, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/331,909

(22) PCT Filed: Dec. 17, 1997

(86) PCT No.: PCT/SG97/00074

§ 371 (c)(1),
(2), (4) Date: Jun. 28, 1999

(87) PCT Pub. No.: WO98/30049

PCT Pub. Date: Jul. 9, 1998

(30) Foreign Application Priority Data

Jan. 3, 1997 (SG) .............................................. 9700278

(51) Int. Cl.$^7$ .............................. H04B 1/18; H04Q 7/00
(52) U.S. Cl. .................. 455/458; 455/161.2; 455/165.1; 455/183.1; 455/185.1; 340/7.43
(58) Field of Search .............................. 455/458, 161.2, 455/165.1, 161.1, 183.1, 185.1, 186.1; 340/7.42, 7.43, 7.2, 7.34, 7.38

(56) References Cited

U.S. PATENT DOCUMENTS 5,627,882 A * 5/1997 Chien et al. ................ 340/7.38
5,682,147 A 10/1997 Eaton et al. ................ 340/7.42

FOREIGN PATENT DOCUMENTS

EP 0 782 354 7/1997 ............ H04Q/7/18

OTHER PUBLICATIONS

PCT Int'l Publication No. WO 97/15160, Apr. 24, 1997, H04Q/7/38, PCT/EP96/04519, Oct. 16, 1996.

\* cited by examiner

Primary Examiner—William Trost
Assistant Examiner—Rafael Perez-Gutierrez
(74) Attorney, Agent, or Firm—Daniel C. Crilly

(57) ABSTRACT

A communication device (1) comprising a receiver (2) for receiving coded messages transmitted on one or more channels. There is a micro-processor (13), in communication with the receiver (2) and a frequency synthesizer (4) coupled to both the micro-processor (13) and the receiver (2) to thereby control reception of the channels. The communication device (1) also has a memory (14) storing a group of-channel frequencies, wherein the micro-processor (13) is adapted, in combination with the frequency synthesizer (4), to control the receiver (2) to scan at least some of the channels during baud detect periods of a protocol cycle associated with at least one of the channels. Further, the micro-processor (13) cyclically offsets a start of the baud detect periods after completion of a protocol cycle.

5 Claims, 3 Drawing Sheets

SELECTIVE CALL RECEIVER AND METHOD FOR DETECTING MANDATORY FRAMES OF A CHANNEL PROTOCOL

FIELD OF THE INVENTION

This invention relates to asynchronous channel frequency scanning associated with a communication device. The invention is particularly suitable for, but not limited to, channel frequency scanning of a channel frequency scan list of selective call receivers.

BACKGROUND ART

Portable communication devices are becoming widely accepted as a form of communication. One type of communication device is known as a selective call receiver, often referred to as a pager, which receives paged information transmitted from one or more transmitters in a system. In this specification, selective call receivers will be used by way of example, however the invention is not necessarily limited to selective call receivers. Such selective call receivers are usually carried by users for receiving paged messages when they are away from their office or home telephone.

As communication receiver users travel more, it is preferable to have a communication receiver, known as a roaming communication receiver, which can operate or roam in one or more selective call systems while still being able to receive relevant messages. Such systems provide transmission of selective call messages from a message originator who contacts a selective call terminal and provides the contents of the message and information identifying the intended selective call receiver user. The selective call terminal encodes the message into one of several known protocols, such as the POCSAG signalling code or the FLEX™ high speed paging protocol. In addition, the terminal appends an address assigned to the communication receiver to the message. The address and message are then modulated onto a selective call signal and transmitted from the selective call terminal.

In systems that employ simulcast techniques as used in the FLEX™ protocol and as mentioned, for example, in U.S. Pat. Nos. 4,696,051 and 4,696,052, a selective call receiver identifies and monitors a valid channel in order to receive messages. In the remainder of this specification channel includes a message transmission frequency and/or System Identification Information (SII). When considering the FLEX™ protocol, this System Identification Information (SII) includes either or both a Network Identifier (NID) or Simulcast System Identifier (SSID). However, other identifiers and other protocols may provide such System Identification Information (SII).

Roaming communication receivers generally have a frequency scan list of possible valid channel frequencies that are periodically scanned. However, depending upon protocol used, a roaming communication receiver may need to be synchronized to a valid channel. Further, such roaming communication receivers must identify that a channel frequency is associated with a valid channel (i.e., the channel is transmitting messages in one or more specific protocols usable by the receiver).

To identify a valid channel a communication receiver has a scan list of channel frequencies store in nonvolatile memory (usually known as a codeplug). These frequencies are usually continuously used to determine which channels are available to the communication receiver. In this regard, the receiver is usually required to frequently scan all relevant channel frequencies in the scan list during a detection portion ("power up" portion) of a scan interval. If any channels are detected during scanning they are then usually processed to determine if they are transmitting messages in one or more specific protocols.

In asynchronous scanning, the communication receiver and channels are not inherently synchronized. It is therefore usually necessary, for example the Flex™ protocol, to detect one or more mandatory frames transmitted in the channels in order for the communication receiver to adequately receive messages transmitted on the channels. Unfortunately, in order to detect these mandatory frames scanning and processing of channels (i.e., baud detection) is required which causes power drain on the power supply of the communication receiver, which for a selective call receiver is usually a type AA or AAA battery. Accordingly, if there are numerous channels (typically between 5 to 15) this can result a relatively rapid battery drain which may be unacceptable.

SUMMARY OF THE INVENTION

It is an aim of the invention to overcome or alleviate at least one of the problems associated with scanning mandatory frames transmitted on channels for use by a communication receiver.

According to one aspect of the invention there is provided a communication device comprising:

receiver means for receiving coded messages transmitted on one or more channels;

processing means, in communication with said receiver means, for processing one or more of said messages;

channel control means coupled to both said processing means and said receiver means, said channel control means being adapted to control said receiver means to thereby control reception of said channels; and a memory means storing a group of channel frequencies, said memory means being coupled to said processing means;

wherein said processing means is adapted, in combination with said control means, to control said receiver means to scan at least some of said channels during baud detect periods of a protocol cycle associated with at least one of said channels; and wherein said processing means cyclically offsets a start of said baud detect periods after completion of a protocol cycle.

Preferably, processing means may be adapted to cyclically offset said start of said baud detect periods by an offset period, said offset period being relative to a start time of a sample interval length.

Suitably, said processing means can be adapted such that said sample interval length is divisible, without a remainder, by said offset period.

Preferably, said communication device may be a selective call receiver.

According to another aspect of the invention there is provided a method for detecting mandatory frames of a channel protocol received by a communication receiver, the method comprising the steps of:

scanning channels during baud detect periods of a protocol cycle;

processing information received during said step of scanning; and cyclically offsetting a start of said baud detect periods after completion of a protocol cycle.

Preferably, said method may be further characterized by said step of cyclically offsetting said start of said baud detect periods by an offset period that is relative to a start time of a sample interval length.

Suitably, said method may be further characterized by said sample interval length being divisible, without a remainder, by said offset period.

Preferably, for a given number of mandatory frames w having a frame time ft, and for pre-determined number of cycles y equal to the number of times said sample interval length is divisible by said offset value, said sample interval length is no greater than:

$$y.((w-1).ft\text{-duration of one baud detect period}).$$

Suitably, at least some of said channels scanned during said baud detect periods may be removed or replaced with other channels.

Preferably, said method may be further characterized by said communication device being a selective call receiver.

BRIEF DESCRIPTION OF THE DRAWINGS

In order that the invention may be readily understood and put into practical effect, reference will now be made to a preferred embodiment as illustrated with reference to the accompanying drawings in which.

DETAILED DESCRIPTION OF A PREFERRED EMBODIMENT OF THE INVENTION

Figure 1:
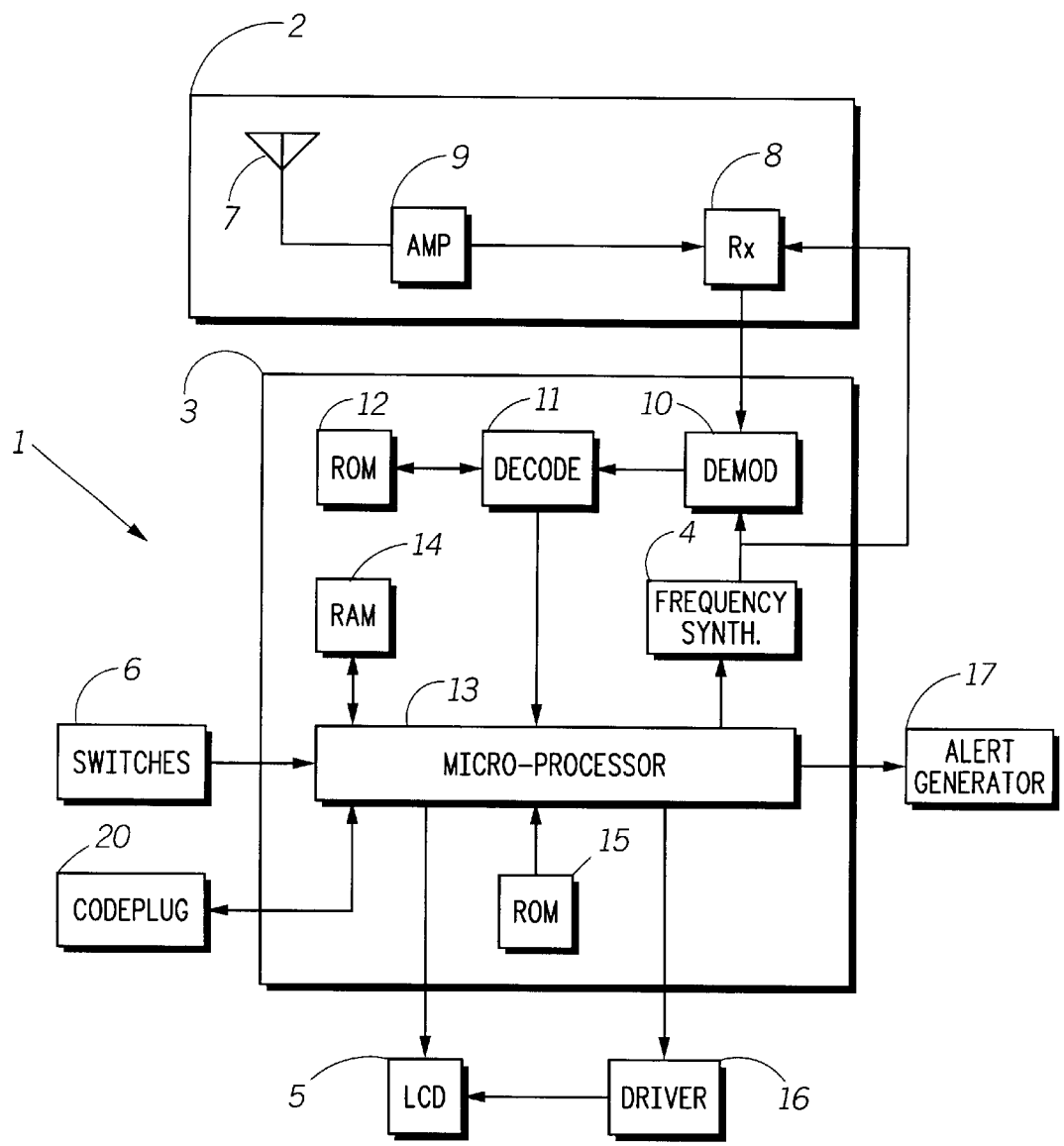
FIG. 1 is a block diagram of a selective call receiver in accordance with an embodiment of an invention.

With reference to FIG. 1 there is illustrated a communication device in the form of a selective call receiver 1 commonly known as a pager. Selective call receiver 1 comprises a receiver means 2 coupled to be in communication with a processing means 3. Processing means 3 includes a channel control means in the form of a frequency synthesizer 4 coupled to be controllable by a micro-processor 13. However, the frequency synthesizer 4 can be arranged to be external to processing means 3. Further, an alert generator 17 is coupled to be controllable by micro-processor 13 and a display in the form of a Liquid Crystal Display (LCD) 5 and user actuatable function switches 6 are coupled to be in communication with micro-processor 13.

In this preferred embodiment receiver means 2 includes a receiver 8 coupled to an antenna 7 by a radio frequency amplifier 9.

The processing means 3 also includes a demodulator 10 coupled to both receiver 8 and a decoder 11. The decoder 11 is coupled to micro-processor 13 and has an associated Read Only Memory (ROM) 12 that stores data for decoding received messages. Micro-processor 13 is also coupled a Random Access Memory (RAM) 14, a Read Only Memory (ROM) 15, and a non-volatile codeplug memory 20. Further, liquid crystal display 5 has an associated slave driver 16 controllable by micro-processor 13.

As will be apparent to a person skilled in the art, alert generator 17 comprises an addressable tone generator addressable by micro-processor 13. Outputs of tone generator 17 are coupled to drive either or both a speaker and a transducer in the form of a vibrator motor for vibrating a casing of selective call receiver 1.

The Read Only Memory 15 stores data for converting decoded received binary messages into characters for displaying on liquid crystal display 5. In this embodiment Read Only Memory 15 also stores operating code for micro-processor 13, whereas Random Access Memory 14 is for storing received decoded paged messages and is also used for storing temporary data such as a dynamic Active List (AL) of channel frequencies. Further, codeplug 20 stores channel information including channel frequencies and information concerning system identifiers such as Simulcast System Identifiers (SSID) or Network Identifiers (NID) as defined in the Flex™ protocol.

Figure 2:
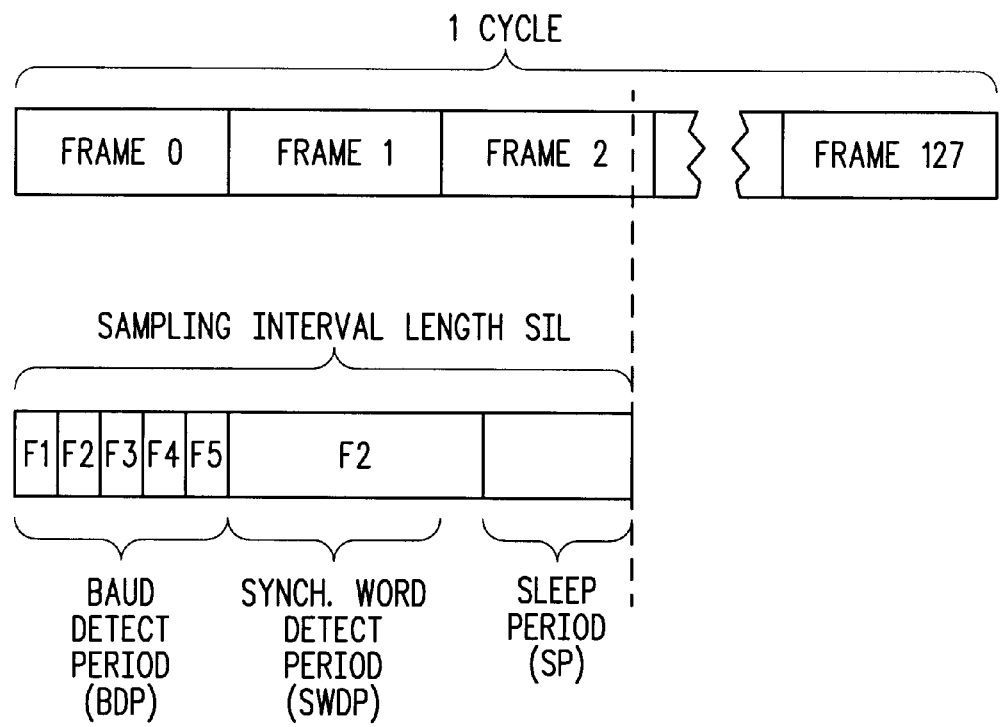
FIG. 2 illustrates a sampling interval associated with a scan list of the selective call receiver of FIG. 1 and the relationship thereof with frames of a channel protocol.

In FIG. 2 there is illustrated a Sampling Interval SI associated with a scan list of the selective call receiver 1. The Sampling Interval SI has a fixed Sampling Interval Length SIL and the scan list is a list of frequencies to be scanned by the selective call receiver 1. The Sampling Interval SI comprises a Baud Detect Period BDP, a Synchronization Word Detect Period SWDP (which only occurs if the Baud Detect Period BDP identifies a channel as probably transmitting at a desired baud rate) and a Sleep Period SP.

As will be apparent to a person skilled in the art, in order for mandatory frames (NID or SSID frames) to be detected in a single cycle of 128 frames or 4 minutes in the Flex™ protocol, the Sampling Interval Length SIL is required to be as follows:

$$SIL=<((w-1).ft-BDP) \tag{1}$$

where w is the number of mandatory frames for a specific protocol and ft is the time in seconds of a frame (for an SSID system w=4; for a SSID+NID system w=8; and ft=1.875 seconds in the Flex™ protocol). Further, BDP is presumed to be the worst case baud detect time.

Figure 3:
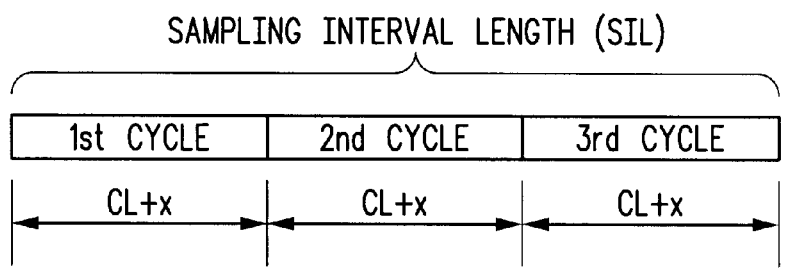
FIG. 3 illustrates an offset period relative to the sampling interval of FIG. 2.

If the Sampling Interval Length SIL is increased then the Sleep Period SP will be longer resulting in a battery saving. Unfortunately, conventional techniques are constrained by the requirement of Sampling Interval Length SIL conforming to equation 1. However, as illustrated in FIG. 3, the Sampling Interval Length SIL can be increased and the mandatory frames detected in y cycles if during each of the cycles the start of the Baud Detect Period is continuously offset by a suitable offset value x (offset period). Hence, the following equation can be derived:

$$x+CL=z.(SIL) \tag{2}$$

$$(SIL/y)=<((w-1).ft-BDP) \tag{3}$$

where CL is the length of cycle in seconds (240 seconds for a Flex™ cycle) and z is an integer.

To allow detection of the mandatory frames in y cycles, SIL must satisfy equation 3 and be divisible (with no remainder) by the offset value x (offset period). Hence, $$x=SIL/y \tag{4}$$

To detect one of the four mandatory frames (mandatory SSID frames) of an SSID of a Flex™ protocol within, for example, 3 cycles with a Baud Detect Period BDP of 0.11 seconds equation 1 is used to determine SIL. Hence, $$(SIL/3)=<((4-1).1.875-0.11) \tag{5}$$

Therefore SIL=<16.545
Further, in equation 2:

$$x+240=z.(SIL)$$

Substituting for x using equation 4:

$$(SIL/y)+240=Z.(SIL) \qquad (6)$$

Therefore $240=(SIL).(z-1/3)$

It is preferable to obtain the most effective battery saving ratio based upon equations 5 and 6. In this regard SIL should be as large as possible and z as small as possible while satisfying equations 4 and 5. Accordingly, for this example z=15 and SIL=16.36 which can yield a battery saving ratio of 14.9:1.

Figure 4:
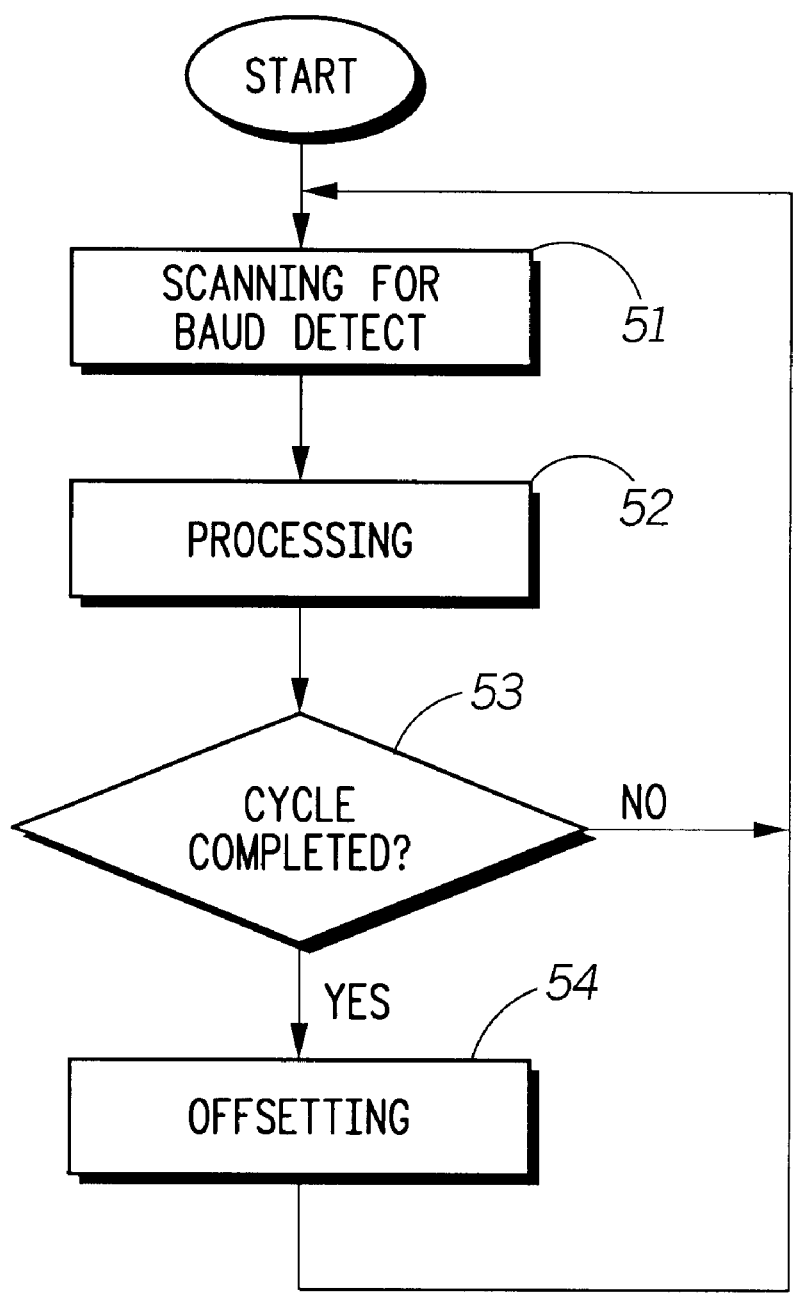
FIG. 4 is a flow diagram illustrating operation of the selective call receiver of FIG. 1 when detecting mandatory frames of a channel protocol.

Referring to FIG. 4, there is a flow diagram illustrating how selective call receiver 1 operates when detecting mandatory frames of a channel protocol. The code associated with this flow diagram is stored in ROM 15 and frequencies channels F1 to F5 for use in Baud Detect Period BDP are copied from codeplug 20 and RAM 14. At a scanning step 51 channels are scanned during Baud Detect Periods of a protocol cycle. In this regard, the frequency synthesizer 4 provides signals to receiver 8 in order to scan the channel frequencies stored in RAM 14 and information received at step 51 is stored in RAM 14. At a processing step 52 the stored received information is processed by processing means 3 in order to determine if any of the scanned channels appear to be operating at a required baud rate. As will be apparent to a person skilled in the art, if any one of the scanned channels appear to be operating at a required baud rate then a synchronization word detect period results as illustrated in FIG. 2.

After processing step 52, a cycle complete test step 53 is effected to determine if a protocol cycle should have been completed (e.g. for a Flex™ cycle there are 128 frames resulting in a cycle time of 240 seconds). Hence, test step 53 determines if 128 time frames have expired and until this occurs steps 51 and 52 are repeated. Accordingly, during a single cycle there will be many scan intervals each having a Baud Detect Period.

When test step 53 determines if 128 time frames have expired (i.e., after completion of a period of time equivalent to the duration of one protocol cycle) an offsetting step 54 offsets a start of said baud detect period by offset value x (offset period). The processing means 3 then returns to step 51 and the above steps 51 to 53 are repeated. Note the offsetting step 54 is inherent and occurs due to the sampling interval derived from the above equations.

Advantageously, the present invention allows for the Sleep Period duration to be increased for each sampling interval therefore assisting in reducing battery drain. Further, the present invention also allows for detecting mandatory frames of a channel stored in the codeplug 20 within y cycles. Obviously, for this to apply the mandatory frames must be on a scanned channel that is receivable by receiver 1.

Although the invention has been described with reference to a preferred embodiment it is to be understood that the invention is not restricted to the particular embodiment described herein.

We claim:

1. A communication device comprising:

receiver means for receiving coded messages transmitted on one or more channels;

processing means, in communication with said receiver means, for processing one or more of said messages;

channel control means coupled to both said processing means and said receiver means, said channel control means being adapted to control said receiver means to thereby control reception of said channels; and a memory means storing a group of channel frequencies, said memory means being coupled to said processing means;

wherein said processing means is adapted, in combination with said control means, to control said receiver means to scan at least some of said channels during baud detect periods of a protocol cycle associated with at least one of said channels, and wherein said processing means cyclically offsets a start of said baud detect periods after completion of a protocol cycle, and wherein said processing means is adapted to cyclically offset said start of said baud detect periods by an offset period, said offset period being relative to a start time of a sample interval length that is divisible, without a remainder, by said offset period.

2. A communication device as claimed claim 1, wherein said communication device is a selective call receiver.

3. A method for detecting mandatory frames of a channel protocol received by a communication receiver, the method comprising the steps of:

scanning channels during baud detect periods of a protocol cycle;

processing information received during said step of scanning; and cyclically offsetting a start of said baud detect periods after completion of a protocol cycle by an offset period that is relative to a start time of a sample interval length, wherein said sample interval length is divisible, without a remainder, by said offset period.

4. A method as claimed in claim 3, wherein for a given number of mandatory frames w having a frame time ft, and for a predetermined number of cycles y equal to the number of times said sample interval length is divisible by said offset value, said sample interval length is no greater than:

$$y.((w-1).ft - \text{duration of one baud detect period}).$$

5. A method as claimed in claim 3, wherein at least some of said channels scanned during said baud detect periods are removed or replaced with other frequencies.

* * * * *